No. 829,993. PATENTED SEPT. 4, 1906.
J. O'CONNOR.
MEAT BASTER.
APPLICATION FILED JAN. 4, 1905.

Witnesses
James F. Duhamel
F. W. Hunter

Inventor,
John O'Connor,
By his Attorneys,
Davids & Wells.

UNITED STATES PATENT OFFICE.

JOHN O'CONNOR, OF NEW YORK, N. Y.

MEAT-BASTER.

No. 829,993.     Specification of Letters Patent.     Patented Sept. 4, 1906.

Application filed January 4, 1905. Serial No. 239,571.

*To all whom it may concern:*

Be it known that I, JOHN O'CONNOR, a citizen of the United States, residing at 925 Eighth avenue, in the city of New York, county and State of New York, have invented a new and useful Improvement in Meat-Basters, of which the following is a specification.

This invention relates to simple means for basting roasting-meat, fowls, &c., and is adapted to the utilization of the ordinary pan or vessel in which the roasting or cooking process is commonly carried out.

In its practical operation the present basting means permits the simulation of the ordinary basting process, in effecting which the gravy, fat, or other basting material is dipped up from the bottom of the pan and poured over the meat.

In its practical embodiment I use in the present means in lieu of the ordinary spoon or other holder an analogous device, so mounting the latter upon the pan, &c., that the device may be moved from a position in which it is adapted to take up gravy, &c., from the bottom of the pan to a position over the roasting meat, onto which the contents of the receptacle descends. Preferably connection of the said movable receptacle or holder is such that the latter may be disconnected and removed from association with the pan, if desired.

Figure 1:
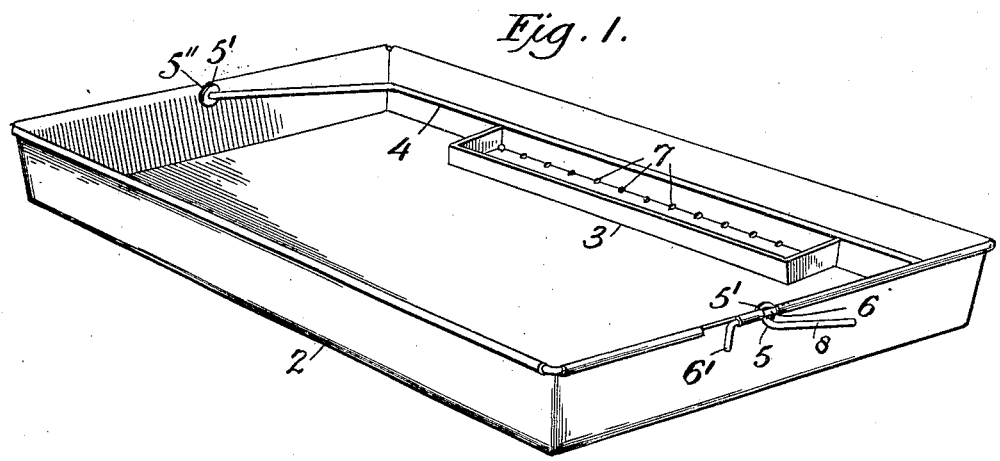
Figure 2:
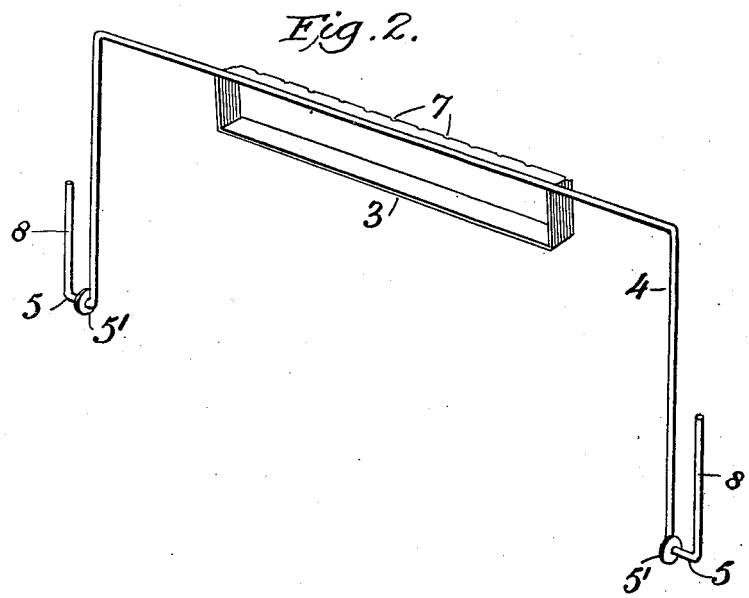

In the drawings accompanying the present specification, Figure 1 is a perspective view of basting means embodying the present invention. Fig. 2 is a perspective view of the receptacle and its frame disconnected from the roasting-pan.

Similar characters of reference designate corresponding parts in both figures.

As already stated, the present basting means is suited to the employment of the usual roasting-pan, which may be used in the ordinary manner to cook the meat, &c. I do not wish, however, to confine myself to the use of this well-known feature as one of the elements of the practical embodiment of the invention, since manifestly other means may be substituted for the usual pan or its equivalent, and the same may or may not be provided, as thought fit, with culinary accessories.

In Fig. 1 a roasting-pan of conventional form is indicated and designated by 2. A movable receptacle or holder (designated in a general way by 3) is here shown, the same being rectangular in form and of convenient cross-sectional area and depth and having a length approximating to the average length of the pieces of meat, the fowls, &c., for which the pan is used. Such receptacle may be made of any suitable and desired material, and in order to enable it to be moved from a position contiguous to the bottom of the pan to a position where the basting material may descend upon the meat the receptacle is connected to a frame, such as 4, which in turn is here mounted to have a swinging movement with relation to the pan. This frame here consists of a bent wire having trunnions 5 5 passing through openings 5 at the ends of the pan adjacent to the upper edges thereof, washers or collars 5' 5' holding the frame longitudinally in position. This frame is of such dimensions as will permit the movement of the receptacle from a position at one side of the pan close to the longitudinal corner thereof upward over the meat.

Preferably the connection of the frame with the pan is such that the former, with the attached receptacle, may be readily disconnected from or associated with the pan, as desired. For this purpose each trunnion-opening may be closed to retain the trunnion in position in the opening by a keeper, such as 6, here slidably mounted on the pan and having an angularly-extending finger-piece 6' for its manipulation.

Notwithstanding the receptacle 3 is comparatively shallow and takes a position when the frame is swung upright such that its contents readily flow over its edge onto the meat, I prefer to perforate (see perforations 7) the bottom of the receptacle to facilitate the entrance of basting material into the latter when down against the bottom of the pan and the discharge therefrom where the receptacle is elevated.

The frame is shown provided with a handle 8 at each side for turning the same.

Having described my invention, I claim—

In a baster, the combination with a pan having a substantially flat bottom and upright corner-forming sides and ends, of an elongated perforated receptacle adapted to rest against the pan-bottom in one of the side corners of the pan, and arms extending from said receptacle and having a swiveled connection with the ends of the pan, whereby by swinging the receptacle, basting material may be lifted from the side corner of the pan and discharged on the meat, &c., in the latter.

In testimony whereof I have signed my name to this specification in the presence of two subscribing witnesses.

JOHN O'CONNOR.

Witnesses:
 PIERSON L. WELLS,
 LILLIAN PERRY.